US009361150B2

(12) United States Patent
Srour et al.

(10) Patent No.: US 9,361,150 B2
(45) Date of Patent: Jun. 7, 2016

(54) RESUMING APPLICATIONS AND/OR EXEMPTING APPLICATIONS FROM SUSPENSION

(71) Applicant: Microsoft Technology Licensing, LLC, Redmond, WA (US)

(72) Inventors: Benjamin S. Srour, Seattle, WA (US); Michael H. Krause, Redmond, WA (US); Richard K. Neves, Kirkland, WA (US); Arun U. Kishan, Kirkland, WA (US); Hari Pulapaka, Redmond, WA (US); David B. Probert, Woodinville, WA (US); Zinaida A. Pozen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/041,870

(22) Filed: Sep. 30, 2013

(65) Prior Publication Data

US 2014/0040917 A1 Feb. 6, 2014

Related U.S. Application Data

(63) Continuation of application No. 13/229,574, filed on Sep. 9, 2011, now Pat. No. 8,578,394.

(51) Int. Cl.
*G06F 13/00* (2006.01)
*G06F 9/46* (2006.01)
(Continued)

(52) U.S. Cl.
CPC ........ *G06F 9/46* (2013.01); *G06F 9/485* (2013.01); *G06F 9/54* (2013.01)

(58) Field of Classification Search
CPC .................. G06F 9/4843; G06F 9/546
USPC .............................. 718/100; 719/313
See application file for complete search history.

(56) References Cited

U.S. PATENT DOCUMENTS

| 4,224,664 A | 9/1980 | Trinchieri |
| 5,375,230 A | 12/1994 | Fujimori |
| 5,911,065 A | 6/1999 | Williams et al. |

(Continued)

FOREIGN PATENT DOCUMENTS

| CN | 101103617 A | 1/2008 |
| CN | 101211212 | 7/2008 |

(Continued)

OTHER PUBLICATIONS

"Non-Final Office Action", U.S. Appl. No. 13/213,540, Jul. 29, 2014, 16 pages.

(Continued)

*Primary Examiner* — Andy Ho
(74) *Attorney, Agent, or Firm* — Kate Drakos; Micky Minhas

(57) ABSTRACT

Only a particular number of applications on a computing device are active at any given time, with applications that are not active being suspended. A policy is applied to determine when an application is to be suspended. However, an operating system component can have a particular application be exempted from being suspended (e.g., due to an operation being performed by the application). Additionally, an operating system component can have an application that has been suspended resumed (e.g., due to a desire of another application to communicate with the suspended application).

25 Claims, 4 Drawing Sheets

(51) Int. Cl.
*G06F 9/48* (2006.01)
*G06F 9/54* (2006.01)

(56) References Cited

U.S. PATENT DOCUMENTS

| | | | |
|---|---|---|---|
| 6,148,408 | A | 11/2000 | Shimoda |
| 6,834,386 | B1 | 12/2004 | Douceur et al. |
| 6,910,210 | B1 | 6/2005 | Chew |
| 6,912,578 | B1 | 6/2005 | Hanko et al. |
| 7,143,398 | B2 | 11/2006 | Chang et al. |
| 7,316,020 | B2 | 1/2008 | Raja et al. |
| 7,584,376 | B2 | 9/2009 | Finkelstein et al. |
| 7,587,718 | B1 | 9/2009 | Mincarelli et al. |
| 7,853,812 | B2 | 12/2010 | McBrearty et al. |
| 8,046,617 | B2 | 10/2011 | Fleck et al. |
| 8,275,802 | B2 | 9/2012 | Mewhinney et al. |
| 8,578,394 | B2 | 11/2013 | Srour et al. |
| 8,869,154 | B1 | 10/2014 | Hillyard et al. |
| 8,997,171 | B2 | 3/2015 | Srour et al. |
| 2003/0126416 | A1* | 7/2003 | Marr et al. ............ 712/235 |
| 2003/0187857 | A1 | 10/2003 | Ford |
| 2005/0003850 | A1 | 1/2005 | Tsuda et al. |
| 2005/0068311 | A1 | 3/2005 | Fletcher et al. |
| 2005/0177832 | A1 | 8/2005 | Chew |
| 2006/0136882 | A1 | 6/2006 | Noonan et al. |
| 2007/0245163 | A1 | 10/2007 | Lu et al. |
| 2008/0085717 | A1 | 4/2008 | Chhabra et al. |
| 2008/0109886 | A1 | 5/2008 | Matsumoto et al. |
| 2008/0168235 | A1 | 7/2008 | Watson et al. |
| 2008/0244616 | A1 | 10/2008 | Brunswig et al. |
| 2009/0019440 | A1 | 1/2009 | Ando |
| 2009/0113444 | A1 | 4/2009 | Hackborn et al. |
| 2009/0271776 | A1 | 10/2009 | Schreier et al. |
| 2009/0307696 | A1 | 12/2009 | Vals et al. |
| 2010/0011198 | A1 | 1/2010 | Hooker et al. |
| 2010/0017506 | A1 | 1/2010 | Fadell |
| 2010/0023788 | A1 | 1/2010 | Scott et al. |
| 2010/0122167 | A1* | 5/2010 | Ryu .................... 715/716 |
| 2010/0248843 | A1 | 9/2010 | Karsten |
| 2011/0047368 | A1 | 2/2011 | Sundaramurthy et al. |
| 2011/0154378 | A1 | 6/2011 | Kishan et al. |
| 2011/0191445 | A1 | 8/2011 | Dazzi |
| 2011/0252423 | A1* | 10/2011 | Freedman et al. ........ 718/100 |
| 2012/0102504 | A1 | 4/2012 | Iyer |
| 2012/0144331 | A1 | 6/2012 | Tolonen et al. |
| 2012/0174106 | A1 | 7/2012 | Seo et al. |
| 2012/0324481 | A1 | 12/2012 | Xia et al. |
| 2013/0024818 | A1 | 1/2013 | Rainisto et al. |
| 2013/0047198 | A1 | 2/2013 | Srour |
| 2013/0061251 | A1 | 3/2013 | Schwartz, Jr. et al. |
| 2013/0067494 | A1 | 3/2013 | Srour |
| 2015/0212919 | A1 | 7/2015 | Srour et al. |

FOREIGN PATENT DOCUMENTS

| | | |
|---|---|---|
| CN | 101860626 A | 10/2010 |
| JP | 2004362426 | 12/2004 |
| TW | I230534 B | 4/2005 |

OTHER PUBLICATIONS

"Foreign Office Action", CN Application No. 201210328979.6, Nov. 3, 2014, 13 pages.

"Notice of Allowance", U.S. Appl. No. 13/213,540, Nov. 13, 2014, 7 pages.

"Application Fundamentals", Retrieved from: <http://developer.android.com/guide/topics/fundamentals.html> on Sep. 24, 2010, (Sep. 23, 2010), 17 pages.

"Automatically Close Inactive Windows, Programs and Tasks with JustCloseSomeTasks", Retrieved from: <http://www.ampercent.com/automatically-close-inactive-windows-programs-tasks/1300/> on Sep. 24, 2010, 2 pages.

"Final Office Action", U.S. Appl. No. 12/911,450, (Mar. 1, 2013), 25 pages.

"Final Office Action", U.S. Appl. No. 13/213,540, (Jul. 11, 2013), 17 pages.

"Introduction", *QNX Neutrino System Analysis Toolkit User's Guide*, Available at <http://www.qnx.com/developers/docs/6.5.0/index.jsp?topic=/com.qnx.doc.instr_en_instr/introduction.html>, (May 10, 2010), 5 pages.

"JSR 278: Resource Management API for JavaTM ME", Available at <http://jcp.org/en/jsr/detail?id=278>,(Jan. 19, 2006), 7 pages.

"Microsoft Windows CE 3.0 Kernel Services: Multiprocessing and Thread Handling", Available at <http://msdn.microsoft.com/en-us/library/ms834459.aspx>,(Jun. 2000), 8 pages.

"Non-Final Office Action", U.S. Appl. No. 12/911,450, (May 30, 2013), 24 pages.

"Non-Final Office Action", U.S. Appl. No. 12/911,450, (Oct. 5, 2012), 20 pages.

"Non-Final Office Action", U.S. Appl. No. 13/213,540, (Feb. 28, 2013),10 pages.

"Notice of Allowance", U.S. Appl. No. 13/229,574, (Jun. 24, 2013), 8 pages.

"PCT Search Report and Written Opinion", Application No. PCT/US2011/054514, (May 29, 2012), 9 pages.

"PCT Search Report and Written Opinion", Application No. PCT/US2012/053679, (Jan. 31, 2013), 8 pages.

"Restriction Requirement", U.S. Appl. No. 13/213,540, (Feb. 4, 2013), 6 pages.

"Restriction Requirement", U.S. Appl. No. 13/229,574, (Mar. 29, 2013), 5 pages.

"Shutdown Inactive Application", Retrieved from: <http://www.bigresource.com/VB-Shutdown-Inactive-Application-OBBAf2TBX1.html> on Sep. 24, 2010, (Oct. 14, 2008), 9 pages.

Chang, Ming-Wei et al., "Implementation and Optimization of DSP Suspend Resume on Dual-Core SOC", ICESS '09, May 25-27, 2009, availabe at <http://ieeexplore.ieee.org/stamp/stamp.jsp?tp=&arnumber=5066647>,(May 25, 2009), pp. 185-190.

Loc-Nguyen, "Developing Power Aware Applications Using D-Bus", Retrieved from <software.intel.com/en-us/articles/developing-power-aware-applications-using-d-bus> on Mar. 1, 2013, (Apr. 22, 2009),10 pages.

Paranjpe, Nitin "Effective use of Task Manager", Retrieved from: <http://www.expresscomputeronline.com/20030915/techspace01.shtml> on Sep. 24, 2010, (Sep. 15, 2003), 4 pages.

"Foreign Office Action", CN Application No. 201210328979.6, Jul. 8, 2015, 13 pages.

"Non-Final Office Action", U.S. Appl. No. 14/660,842, Sep. 28, 2015, 17 pages.

"Third Office Action Issued in Chinese Patent Application No. 201210328979.6", Mailed Date: Jan. 5, 2016, 15 Pages.

"Final Office Action Issued in U.S. Appl. No. 14/660,812" Mailed Date: Feb. 5, 2016, 11 pages.

* cited by examiner

RESUMING APPLICATIONS AND/OR EXEMPTING APPLICATIONS FROM SUSPENSION

RELATED APPLICATIONS

This application is a continuation of U.S. patent application Ser. No. 13/229,574, filed Sep. 9, 2011, entitled "Resuming Applications and/or Exempting Applications from Suspension" to Benjamin Salim Srour, et al., now U.S. Pat. No. 8,578,394, the entire disclosure of which is hereby incorporated by reference herein in its entirety.

BACKGROUND

Many computing devices can run multiple programs concurrently, some being used by the user and others running in the background or ready to be used by the user. Running multiple programs concurrently typically allows the user to quickly switch between programs that he or she desires to use, but is not without its problems. One such problem is that these multiple programs oftentimes include programs running in the background that provide little if any value to the user, and are not likely to be used anytime soon by the user. These programs can use significant amounts of resources (such as processor time, memory, etc.), which can lead to using energy unnecessarily and decreased battery life for battery powered computing devices. However preventing multiple programs from running concurrently can decrease responsiveness and functionality that users expect due to the need to re-start the programs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a determination is made of one application of multiple applications running on a computing device that is to be exempted from being suspended. In response to the determination, the one application is exempted from being suspended on the computing device.

In accordance with one or more aspects, a request to resume execution of an application that has been suspended due to the computing device no longer displaying a user interface for the application is received. The request is received from an operating system component running on the computing device. In response to the request, execution of the application is resumed.

BRIEF DESCRIPTION OF THE DRAWINGS

The same numbers are used throughout the drawings to reference like features.

DETAILED DESCRIPTION

Resuming applications and/or exempting applications from suspension is discussed herein. Multiple applications can be started and loaded into the memory of a computing device concurrently, but only a particular number of those applications (e.g., one or two) are active at any given time. Applications that are not active are suspended, which refers to the applications not being able to use the processor. A policy is applied to determine when an application is to be suspended. However, an operating system component can have a particular application be exempted from being suspended (e.g., due to an operation being performed by the application). Additionally, an operating system component can have an application that has been suspended resumed (e.g., due to a desire of another application to communicate with the suspended application).

Suspending rather than terminating applications resolves various issues regarding having unnecessary applications running in the background. It is often faster and more efficient to unsuspend a program rather than restart it, but while it is suspended it is prevented from executing and consuming energy or interfering with the applications the user is using. However, a technical challenge remains in determining when it is okay to suspend an application, and when an application should be terminated instead of suspended. These determinations can be made at least in part by observing and modifying policies maintained by the system for particular applications and/or classes of applications.

Figure 1:
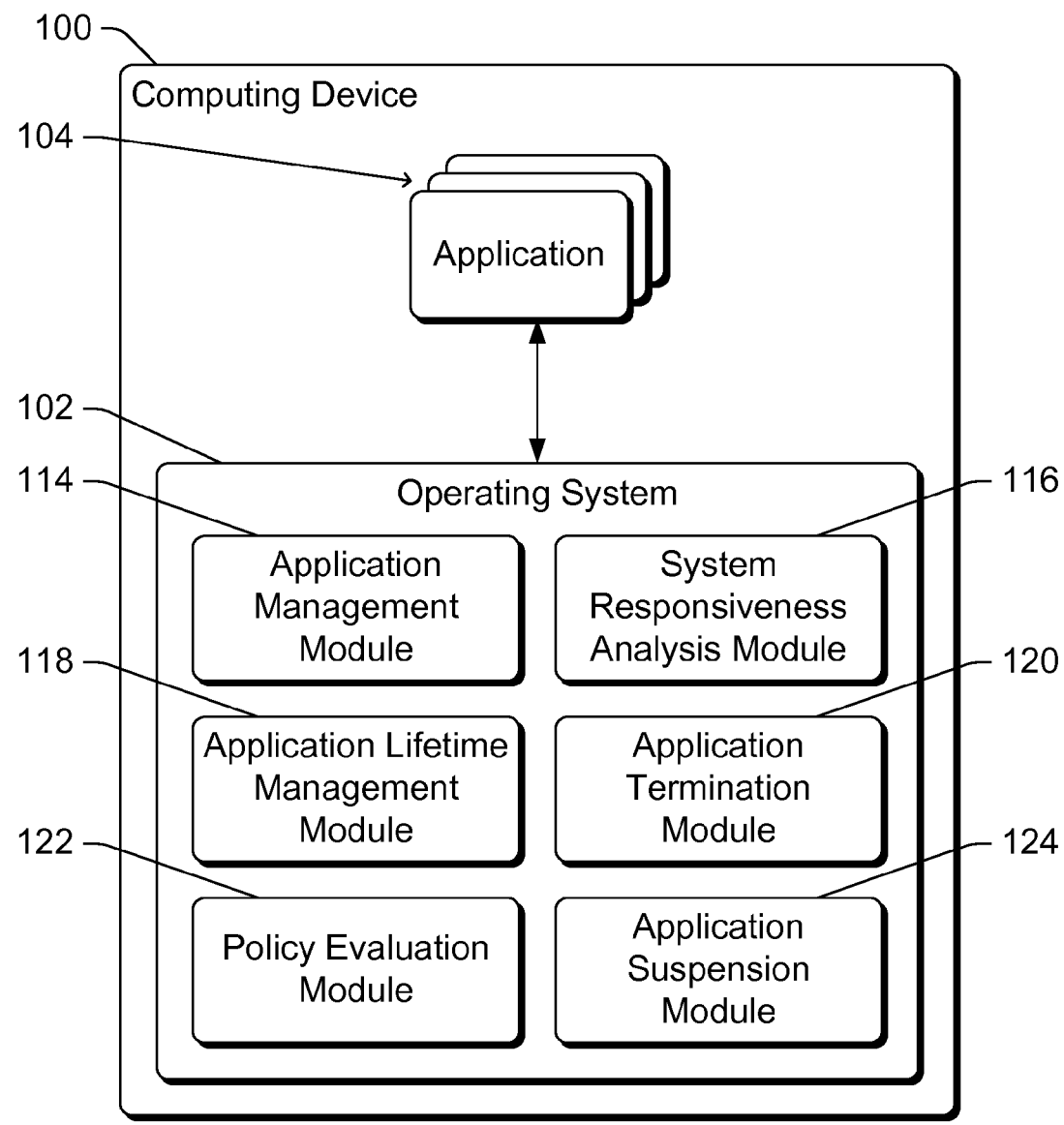
FIG. 1 is a block diagram illustrating an example computing device implementing the resuming applications and/or exempting applications from suspension in accordance with one or more embodiments.

FIG. 1 is a block diagram illustrating an example computing device 100 implementing the resuming applications and/or exempting applications from suspension in accordance with one or more embodiments. Computing device 100 can be a variety of different types of devices. For example, computing device 100 can be a laptop or netbook computer, a tablet or notepad computer, a desktop computer, a server computer, a mobile station, an entertainment appliance, a set-top box communicatively coupled to a display device, a television or other display device, a cellular or other wireless phone, a game console, an automotive computer, and so forth. Thus, computing device 100 may range from a full resource device with substantial memory and processor resources (e.g., personal computers, game consoles) to a low-resource device with limited memory and/or processing resources (e.g., traditional set-top boxes, hand-held game consoles).

Computing device 100 includes an operating system 102 and one or more applications 104. During operation, operating system 102 and applications 104 run on computing device 100, with operating system 102 managing applications 104. The management of applications 104 can include automatically terminating one or more applications 104, as discussed in more detail below.

Operating system 102 includes an application management module 114, a system responsiveness analysis module 116, an application lifetime management module 118, an application termination module 120, a policy evaluation module 122, and an application suspension module 124. Although modules 114-124 are illustrated as being part of operating system 102, alternatively one or more of modules 114-124 can be implemented separately from operating system 102. Additionally, it should be noted that the functionality provided by one or more of modules 114-124 can be separated into multiple modules, and/or that at least some of the functionality provided by two or more of modules 114-124 can be combined into a single module. Furthermore, although modules 114-124 are illustrated, it should be noted that operating system 102 can include various additional modules providing various additional functionality.

Various modules of operating system 102 are discussed herein as notifying or communicating various indications or information to one another. It should be noted that such notification or communication can take various forms. For example, one module can invoke an application programming interface (API) of another module, one module can report an event that another module has registered to receive, one module can store data or other information in a location from which another module can retrieve the data or information, and so forth.

Application management module 114 monitors or is otherwise aware of which applications 104 are running on computing device 100 at any given time, including active and inactive applications. An active application refers to an application that is currently being scheduled for execution by one or more processors of computing device 100 and thus an application that is being allocated processor time for execution. An inactive application refers to an application that is not currently being scheduled for execution by one or more processors of computing device 100 and thus an application that is not being allocated processor time for execution. An application 104 can be loaded into memory of computing device 100 but be an inactive application, as discussed in more detail below.

Application management module 114 also monitors or is otherwise aware of which applications 104 are being used at any given time. Generally, an application 104 is being used at a particular time if a user interface for the application is being displayed or otherwise presented by computing device 100 at that particular time and/or a user of computing device 100 is providing user inputs to the application at that particular time. Module 114 can determine which applications 104 are being used at any given time in a variety of different manners. For example, module 114 can determine that an application 104 is currently being used if a window in which that application displays a user interface is currently being displayed on a display device that is part of or coupled to computing device 100, that an application 104 is currently being used if a window in which that application displays a user interface is a top or highest level window being displayed on a display device that is part of or coupled to computing device 100, that an application 104 is currently being used if a window in which that application displays a user interface is not minimized, and so forth. An application can also be referred to as being used at a particular time if another application that is being used at the particular time is communicating with the application. For example, module 114 can determine that an application 104 is currently being used if that application 104 is communicating with another application 104 that displays a user interface that is a top or highest level window being displayed on a display device that is part of or coupled to computing device 100.

In one or more embodiments, operating system 102 allows a particular number of windows (e.g., one or two) to be displayed at any given time. Applications 104 display their user interfaces within such windows, and thus only the particular number of applications 104 can display their user interfaces at any given time. At any particular time, an application 104 that is displaying a user interface on a display device that is part of or coupled to computing device 100 is determined as being an application 104 that is currently being used by a user of computing device 100 at that particular time. And, an application 104 that is not displaying a user interface on a display device that is part of or coupled to computing device 100 is determined as being an application 104 that is not currently being used by a user of computing device 100 at that particular time.

Application lifetime management module 118 controls the policy applied by operating system 102 to determine which applications 104 can execute. This policy can indicate how to determine whether an application 104 is active or inactive at any given moment, how to determine which application 104 is to be terminated, how many windows can be displayed at any given time, and so forth. Module 118 can obtain the policy in a variety of different manners, such as being preconfigured with the policy, receiving the policy from a user of computing device 100 (e.g., via various preference or configuration settings), receiving the policy from another module of computing device 100 or from another computing device, receiving the policy from a network (e.g., from another device or service via the network), and so forth.

Policy evaluation module 122 determines whether the policy applied by operating system 102 is being satisfied by applications 104. Policy evaluation module 122 communicates with application management module 114 to determine which applications 104 are being used at any given time. Based on this determination and the policy, module 122 determines whether the policy is being satisfied by applications 104. For example, if the policy indicates that applications that are not being used be inactive, and if one or more applications that are not being used by a user of computing device 100 are active at a particular time, then module 122 determines that the policy is not being satisfied by applications 104 at that particular time.

In response to determining that applications 104 do not satisfy the policy, policy evaluation module 122 determines one or more applications 104 to suspend so that applications 104 do satisfy the policy. Suspending an application refers to making the application inactive. Policy evaluation module 122 determines which one or more applications 104 to suspend based on the determination of which applications 104 are being used and the policy. For example, if the policy indicates that applications that are not being used be inactive, and if one or more applications that are not being used are active at a particular time, then module 122 determines that the applications 104 that are not being used but are active are the one or more applications 104 to suspend.

Application suspension module 124 receives from policy evaluation module 122 an indication of one or more applications 104 to suspend. In response to the indication to suspend one or more applications 104, policy suspension module 124 suspends the indicated one or more applications 104. An application is suspended by notifying the application that it is to be suspended. The application is optionally given an amount of time (e.g., 1 second or 4 seconds) to save data and/or state information that the application deems is to be saved prior to being suspended. The application stores data and/or state information to a nonvolatile or other persistent storage device, allowing the data and/or state information to be subsequently retrieved (even if the application is terminated). Suspending an application refers to changing the application from being active to being inactive. An inactive application (also referred to as a suspended application) is not executed by a processor of computing device 100 as discussed above. An application can be suspended in different manners, such as by invoking an API of operating system 102 to suspend the application.

It should be noted that once suspended, an application can subsequently become active. For example, a user input can be received from a user indicating that he or she desires to use an application. If the application is inactive, the application is made active in response to a user request to use the application, and the application is executed by one or more processors of computing device 100. Making a suspended application an active application is also referred to as resuming the application. Once active again, the application resumes execution, restoring saved state as appropriate for the application.

System responsiveness analysis module 116 uses one or more of various metrics regarding memory usage to determine whether to terminate one or more applications 104. For example, system responsiveness analysis module 116 can determine that one or more applications 104 are to be terminated based on a memory load metric that refers to an amount of memory allocated to applications 104, an available physical memory metric that refers to an amount of physical memory that is available at any given time, an available page file space metric that refers to an amount of available storage space on a storage device in which pages are stored, an average lifetime on standby list metric that refers to the average lifetime of pages on a standby list maintained by a memory manager of operating system 102, and so forth. System responsiveness analysis module 116 notifies, in response to determining that one or more applications 104 are to be terminated, application termination module 120 to terminate one or more applications 104.

Application termination module 120 determines, in response to a notification from system responsiveness analysis module 116 to terminate one or more applications 104, one or more applications 104 to terminate. An application can be terminated in different manners, such as by invoking an API of operating system 102 to terminate the application. In one or more embodiments, module 120 selects to terminate one or more applications 104 that have been suspended and terminates the selected one or more applications 104. Application termination module 120 can determine which particular applications 104 to terminate in various manners, such as based on how recently each of applications 104 was used, how frequently each of applications 104 is used, an amount of memory used by the applications 104, and so forth.

Alternatively, rather than terminating an application, application termination module 120 can move an application out of primary memory into secondary memory, such as a hard disk or flash storage device. Module 120 can determine which particular applications 104 to move in various manners analogous to the determination of which particular applications 104 to terminate as discussed above. An application 104 can be moved in different manners, such as by invoking an API of operating system 102 to move the application, copying pages of memory used by the application to the secondary storage device, and so forth.

Application lifetime management module 118 can also receive a request from another module or component of operating system 102 to exempt an application 104 from being suspended. Such a request is made, for example, by a module or component of operating system 102 that is aware of an operation being performed by the application 104 that is not yet finished (e.g., playing back audio content, printing a document, and so forth). In response to a request to exempt a particular application from being suspended, application lifetime management module 118 notifies policy evaluation module 122 that when determining which one or more applications 104 to suspend that that particular application is not to be suspended. Exempting an application from being suspended refers to preventing the application from being suspended—if the application would have otherwise (absent the request to exempt the application from being suspended) been suspended, the request to exempt the application from being suspended prevents the application from being suspended.

Application lifetime management module 118 can also receive a request from another module or component of operating system 102 to resume execution of a suspended application 104. Such a request is made, for example, by a module or component of operating system 102 that is aware of an application 104 that desires to communicate with a suspended application. In response to a request to resume execution of a suspended application, application lifetime management module 118 resumes the application. An application can be resumed in different manners, such as by invoking an API of operating system 102 to resume the application. Application lifetime management module 118 can also resume a terminated application by having the terminated application re-started (e.g., by invoking an API of operating system 102 to re-start the application), and then resuming the application.

Figure 2:
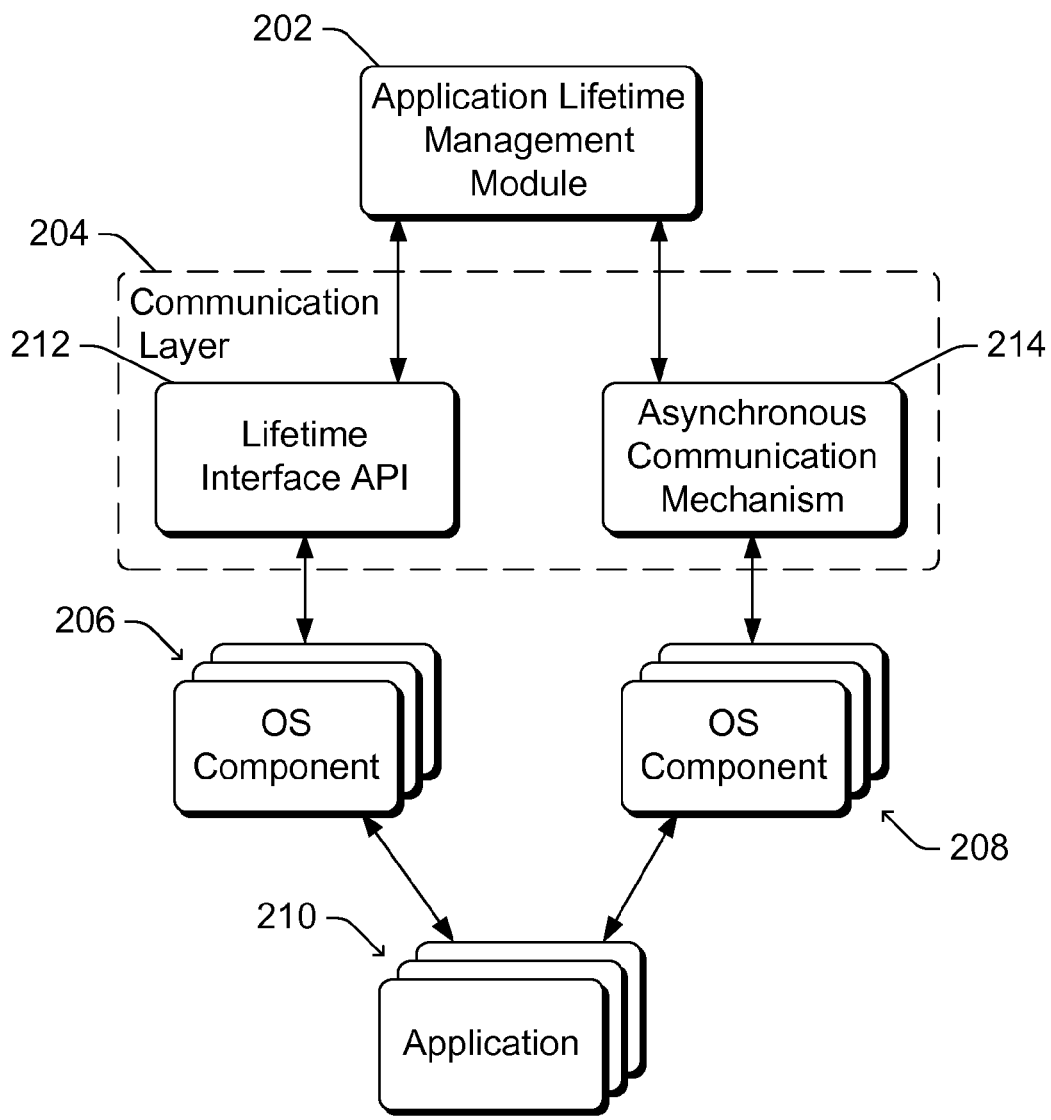
FIG. 2 illustrates an example system implementing the resuming applications and/or exempting applications from suspension in accordance with one or more embodiments.

FIG. 2 illustrates an example system 200 implementing the resuming applications and/or exempting applications from suspension in accordance with one or more embodiments. System 200 can be implemented by, for example, a computing device 100 of FIG. 1. System 200 includes an application lifetime management module 202, which can be an application lifetime management module 118 of FIG. 1. System 200 also includes a communication layer 204, one or more operating system (OS) components 206, one or more operating system (OS) components 208, and one or more applications 210. Applications 210 can be, for example, applications 104 of FIG. 1. OS components 206, 208 are various components or modules of an operating system (e.g., operating system 102 of FIG. 1). Communication layer 204 allows operating system components 206, 208 to communicate requests to application lifetime management module 202. These requests include requests to resume execution of a suspended application and requests to exempt an application from being suspended. Communication layer 204 is illustrated as a lifetime interface API 212 or an asynchronous communication mechanism 214, although other communication mechanisms can alternatively be used. It should be noted that communication layer 204 is typically exposed to operating system components 206, 208, but not to applications 210. Thus, operating system components 206, 208 can submit requests to module 202 via communication layer 204 based on requests or actions of applications 210, but applications 210 themselves cannot directly communicate with module 202 via communication layer 204.

Some OS components 206 communicate with module 202 using a lifetime interface API 212, and other OS components 208 communicate with module 202 using asynchronous communication mechanism 214. How an OS component communicates with module 202 can be determined in different manners, and can be a design choice on the part of the developer of the OS component. In one or more embodiments, the manner in which an operating system component communicates with module 202 is determined based on whether the operating system component is running in a user mode or a kernel mode. For example, if an operating system component is running in a kernel mode then the operating system communicates with module 202 using asynchronous communication mechanism 214, and if the operating system component is running in a user mode then the operating system component communicates with module 202 using lifetime interface API 212.

Lifetime interface API 212 exposes one or more methods that can be invoked by an operating system component 206. A method of API 212 can be invoked by an operating system component 206, providing an identifier of an application 210 as a parameter. A variety of different identifiers of applications 210 can be used that allow the applications 210 to be distinguished from one another. For example, the identifier of an application 210 can be an identifier of a package that includes the application (e.g., a combination of a name of the application, a name of a publisher of the package, an indication of an architecture with which the application is designed to operate, a version number of the package, and/or various other characteristics of the package). The operating system component 206 can also provide an exemption class or resumption class as a parameter. The exemption class or resumption class indicates a reason why operating system component 206 is making the request, and can be used in a variety of different manners as discussed below. The exemption class or resumption class can be identified as a parameter when invoking a method of API 212, or alternatively can be inherent in the method invoked (e.g., different methods can be exposed for different exemption and/or resumption classes). The type of request (e.g., a request to resume execution of a suspended application or a request to exempt an application from being suspended) can be identified as a parameter when invoking a method of API 212, or alternatively the request can be inherent in the method invoked (e.g., different methods can be exposed for different types of requests).

Asynchronous communication mechanism 214 includes a module or component that can receive notifications from various operating system components 208. Other components or modules (such as application lifetime management module 202) can subscribe to these notifications. Thus, whenever an operating system component 208 provides a notification to mechanism 214, mechanism 214 provides the notification to module 202. This notification can include various information, such as an identifier of an application 210 (which can take various forms as discussed above), an indication of an exemption class or resumption class for the request, and/or an indication of a type of request (e.g., whether the request is a request to resume execution of a suspended application or a request to exempt an application from being suspended).

In response to a request to exempt an application from being suspended, application lifetime management module 202 trusts that the operating system component 206, 208 making the request is doing so for an appropriate reason. Thus, module 202 prevents the application from being suspended by notifying an evaluation module that when determining which one or more applications 104 to suspend that the identified application is not to be suspended.

An operating system component 206, 208 can request that an application be exempted from being suspended for various reasons, and different operating system components 206, 208 can request that applications be suspended for different reasons. Typically, an operating system component 206, 208 requests that an application 210 be exempted from being suspended in response to the operating system component 206, 208 determining that the application 210 is performing an operation that is to be allowed to continue, but that would not continue if the application 210 were suspended. For example, an application 210 could be performing a printing operation that involves providing on a page-by-page basis data for a document to be printed. The operating system component 206, 208 (e.g., a print spooler) requests that the application 210 be exempted from being suspended because if the application 210 were to be suspended before printing of the document finishes, then printing of the document would not finish. By way of another example, an application 210 could be an audio player application playing back audio content (e.g., a song or playlist of songs). The operating system component 206, 208 (e.g., an audio API) requests that the application 210 be exempted from being suspended because if the application 210 were to be suspended then playback of the audio content would stop.

By way of yet another example, an application 210 could be communicating with a device (e.g., camera, network interface card, wireless device, etc.) via an operating system component 206, 208 that is a device driver. The operating system component 206, 208 determines that the application is actively using the device if the communication (e.g., input/output (I/O) between the application 210 and device) is occurring at at least a threshold rate, and requests that the application 210 be exempted from being suspended if the application is actively using the device. By way of still another example, an application 210 could be sharing information (e.g., photos, music, videos, etc.) with another application (e.g., through a well-defined interface) as part of a share operation. If a share operation is being performed, the operating system component 206, 208 (e.g., that facilitates or is otherwise aware of the share operation) requests that the application 210 be exempted from being suspended so that the share operation can be completed. Various other operations could also cause an operating system component to request that an application be exempted from being suspended, such as an application transferring data to and/or from another device (e.g., on a local area network, over the Internet, etc.), an application performing some device utility operation (e.g., backing up a hard drive, checking for malware), and so forth.

The request that an application be exempted from being suspended can also indicate an exemption class. Various different exemption classes can be used, and each exemption class identifies the reason why the application is being requested to be exempted from being suspended. For example, exemption classes could be printing, audio, device I/O, and so forth.

Alternatively, rather than specifying an exemption class, application lifetime management module 202 can infer the reason why the application is being requested to be exempted from being suspended. For example, each operating system component 206, 208 can have a particular reason why it requests that an application be exempted from being suspended. Thus, module 202 can identify the reason why an application is being requested to be exempted from being suspended based on the operating system component 206, 208 from which the request was received.

Application lifetime management module 202 can exempt an application from being suspended indefinitely, or alternatively until some event occurs or some amount of time elapses. For example, such an event can be that the operating system component that requested that the application be exempted from being suspended notifies module 202 when the application is to no longer be exempted from being suspended (e.g., because a document finished printing, because a user paused playback of audio content for at least a threshold amount of time (e.g., two minutes), etc.). By way of another example, module 202 can exempt an application from being suspended for a particular amount of time (e.g., five minutes, one hour, etc.) This particular amount of time can be determined in different manners, such as based on the reason why the application is being requested to be exempted from being suspended (e.g., different exemption classes for the request provided by operating system components can have different particular amounts of time), based on a default configuration of module 202, based on an indication of the particular amount of time received as a parameter of the request from module 202, and so forth. This particular amount of time could optionally be extended by the operating system component by, for example, submitting one or more additional requests to exempt the application from being suspended. In response to such an event or amount of time elapsing, the application is no longer exempted from being suspended. Accordingly, module 202 invokes a policy evaluation module (e.g., policy evaluation module 122 of FIG. 1) to suspend the application, or to determine whether the policy applied by the operating system is being satisfied by the applications 210 as discussed above.

The reason why the application is being requested to be exempted from being suspended (e.g., an exemption class for the request provided by the operating system component) can also be used in other manners. For example, application lifetime management module 202 can include (or invoke another module including) functionality to maintain a record of which modules 206, 208 requested that applications be exempted from being suspended, the reason why those operating system components requested that the applications be exempted from being suspended, and/or which applications were exempted from being suspended. This record can be used in various manners, such as to identify potential abuses of the requests to exempt applications from being suspended, to identify a frequency with which requests to exempt applications from being suspended are received, and so forth.

In response to a request to resume execution of a suspended application, application lifetime management module 202 trusts that the operating system component 206, 208 making the request is doing so for an appropriate reason. Thus, module 202 resumes the suspended application, such as by invoking an API of operating system 102 to resume the suspended application.

An operating system component 206, 208 can request that an application be resumed for various reasons, and different operating system components 206, 208 can request that applications be resumed for different reasons. Typically, an operating system component 206, 208 requests that an application be resumed in response to a desire of another application, component, or module to communicate with the suspended application. For example, an application 210 may desire to communicate with another application 210 using any of a variety of conventional inter-process communication techniques. The operating system component 206, 208 requests that the other application 210 be resumed because the other application 210 cannot communicate if suspended (because the suspended application is not being scheduled for execution). By way of another example, an application 210 may desire to obtain data from another application 210 in response to a user request received by the other application 210 (e.g., a request to paste data copied from the other application 210). The operating system component 206, 208 requests that the other application be resumed because the data cannot be obtained from the other application 210 if the other application 210 is suspended.

By way or another example, an operating system component 206, 208 itself may desire to communicate with a suspended application (e.g., to enumerate something in or otherwise obtain information or data from the suspended application). The operating system component requests that the application 210 be resumed because the application 210 cannot communicate if suspended. It should be noted that these are example reasons why an operating system component 206, 208 may request that a suspended application 210 be resumed, and that an operating system component 206, 208 can request that an application 210 be resumed for any of a variety of other reasons.

The request to resume execution of a suspended application can also indicate a resumption class for the request. Various different resumption classes can be used, and each resumption class identifies the reason why the application is being requested to be resumed. For example, resumption classes could be inter-process communication, user request, operating system component desire, and so forth.

Alternatively, rather than specifying a resumption class, application lifetime management module 202 can infer the reason why the application is being requested to be resumed. For example, each operating system component 206, 208 can have a particular reason why it requests that an application be resumed. Thus, module 202 can identify the reason why an application is being requested to be resumed based on the operating system component 206, 208 from which the request was received.

Once an application is resumed, application lifetime management module 202 exempts the application from being suspended. This exemption is analogous to the discussion above, except the exemption is done in response to the request to resume execution of the suspended application. The application can be exempted from being suspended indefinitely, or alternatively until some event occurs or some amount of time elapses, analogous to the discussion above. For example, application management lifetime module 202 can exempt the application from being suspended for a particular amount of time (e.g., two seconds, ten seconds), and the particular amount of time can be based on the reason why the application is being requested to be resumed. By way of another example, application management lifetime module 202 can exempt the application from being suspended until a notification is received from the operating system component that the reason for requesting that the application be resumed is no longer present. In response to such a notification, module 202 invokes a policy evaluation module (e.g., policy evaluation module 122 of FIG. 1) to suspend the application, or to determine whether the policy applied by the operating system is being satisfied by the applications 210 as discussed above.

In one or more embodiments, an operating system component 206, 208 requesting to resume execution of a suspended application maintains a counter or other record of how many applications (or operating system components) have requested an action that triggers making the request (an action that causes the operating system component to make the request to resume execution of the suspended application). Different counters or other records can be maintained for different reasons. For example, if three different applications request to communicate with a suspended application using an inter-process communication technique, then the operating system component 206, 208 maintains a counter or other record indicating that three applications have requested an action that would trigger making the request. If an additional application requests to communicate with the suspended application using an inter-process communication technique, then the counter is incremented or other record updated to indicate that four applications have requested an action that would trigger making the request. Or, if one of the applications finishes its inter-process communication (after the suspended application was resumed), then the counter is decremented or other record updated to indicate that two applications have requested an action that would trigger making the request.

When the counter or other record changes from zero applications having requested an action that would trigger making the request to one application having requested an action that would trigger making the request, then the operating system component requests to resume execution of the suspended application. Additional changes of the counter or other record indicating more than one application have requested an action that would trigger making the request do not cause the operating system component to request to resume execution of the suspended application because the request has already been made. When the counter or other record changes from one application having requested an action that would trigger making the request to zero applications having requested an action that would trigger making the request, then the operating system component notifies the application lifetime management module 202 to have the policy evaluation module determine whether the policy applied by the operating system is being satisfied by the applications. If the resumed application is no longer exempted from being suspended (e.g., due to a request from another OS component 206, 208), then the resumed application can be suspended in accordance with the policy. Additional changes of the counter or other record indicating that still more than one application have requested an action that would trigger making the request do not cause the operating system component to notify module 202 to have the policy evaluation module determine whether the policy applied by the operating system is being satisfied by the applications because at least one application has still requested an action that would trigger making the request to resume execution of the suspended application.

Figure 3:
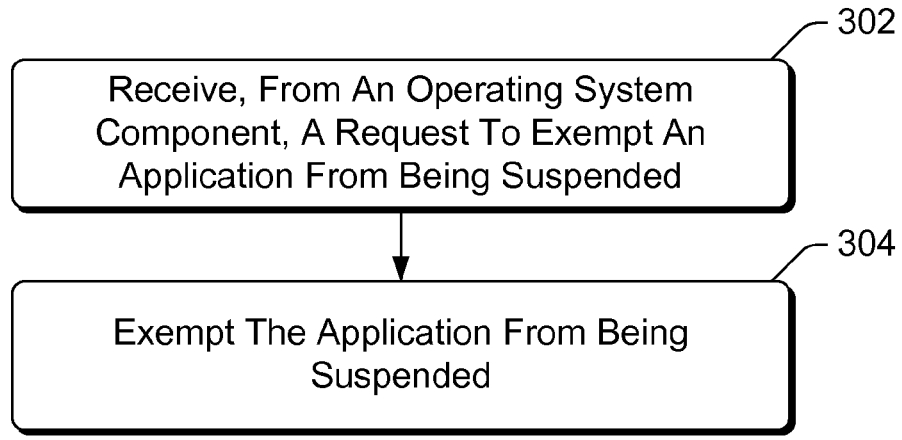
FIG. 3 is a flowchart illustrating an example process for a device implementing the resuming applications and/or exempting applications from suspension in accordance with one or more embodiments.

FIG. 3 is a flowchart illustrating an example process 300 for a device implementing the resuming applications and/or exempting applications from suspension in accordance with one or more embodiments. Process 300 is carried out by a device, such as device 100 of FIG. 1, and can be implemented in software, firmware, hardware, or combinations thereof. Process 300 is shown as a set of acts and is not limited to the order shown for performing the operations of the various acts. Process 300 is an example process for implementing the resuming applications and/or exempting applications from suspension; additional discussions of implementing the resuming applications and/or exempting applications from suspension are included herein with reference to different figures.

In process 300, a request is received to exempt an application from being suspended (act 302). The request is received from an operating system component, and thus is trusted as discussed above.

In response to the request received in act 302, the application is exempted from being suspended (act 304). By exempting the request, the application is not suspended even though the application may otherwise have been suspended due to one or more applications running on the computing device not satisfying a policy as discussed above. The application can be exempted from being suspended indefinitely, or alternatively until some event occurs or some amount of time elapses as discussed above.

Figure 4:
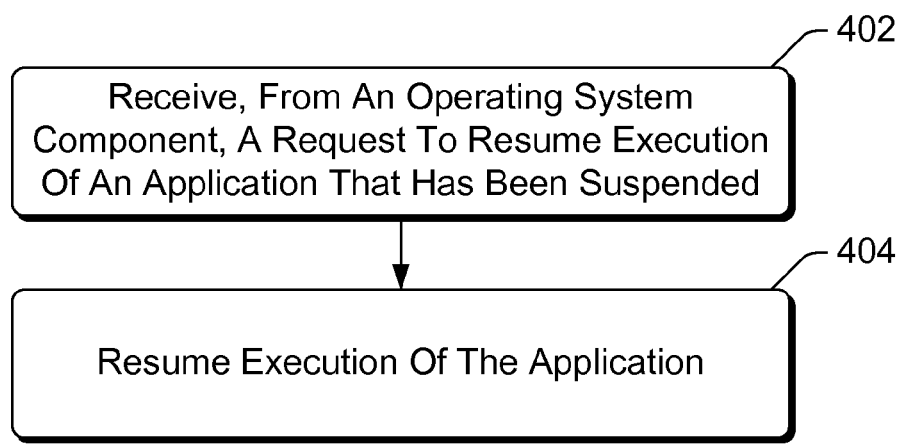
FIG. 4 is a flowchart illustrating another example process for a device implementing the resuming applications and/or exempting applications from suspension in accordance with one or more embodiments.

FIG. 4 is a flowchart illustrating another example process 400 for a device implementing the resuming applications and/or exempting applications from suspension in accordance with one or more embodiments. Process 400 is carried out by a device, such as device 100 of FIG. 1, and can be implemented in software, firmware, hardware, or combinations thereof. Process 400 is shown as a set of acts and is not limited to the order shown for performing the operations of the various acts. Process 400 is an example process for implementing the resuming applications and/or exempting applications from suspension; additional discussions of implementing the resuming applications and/or exempting applications from suspension are included herein with reference to different figures.

In process 400, a request is received to resume execution of an application that has been suspended (act 402). The request is received from an operating system component, and thus is trusted as discussed above. The application would have been suspended, for example, due to the computing device no longer displaying a user interface for the application as discussed above.

In response to the request, the execution of the application is resumed (act 404). The application is also exempted from being suspended on the computing device indefinitely, or alternatively until some event occurs or some amount of time elapses as discussed above.

Thus, the resuming applications and/or exempting applications from suspension techniques discussed herein support various usage scenarios. A policy can be applied to suspend applications that are not being used, resulting in applications that are not displaying a user interface being suspended. However, if such an application is performing an operation that an operating system component determines is to be allowed to continue (e.g., printing, playing audio content), then the application can be exempted from being suspended. Furthermore, if communication with a suspended application is desired, then an operating system component can have execution of the suspended application resumed. After communication with the suspended application is completed, the operating system component can have the application suspended again (assuming a policy does not otherwise indicate that the application is not to be suspended).

Figure 5:
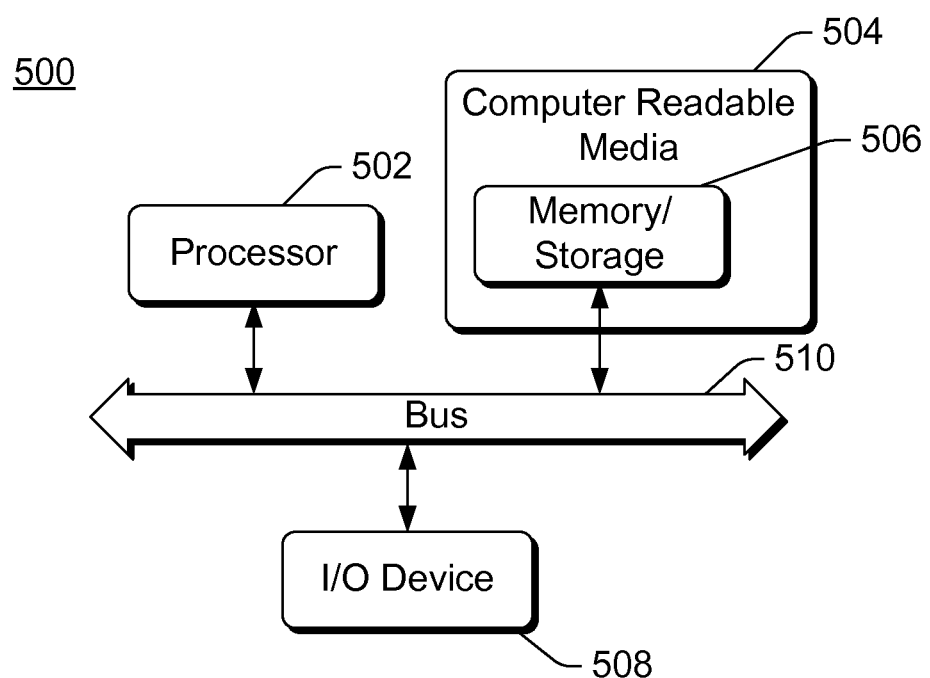
FIG. 5 illustrates an example computing device that can be configured to implement the resuming applications and/or exempting applications from suspension in accordance with one or more embodiments.

FIG. 5 illustrates an example computing device 500 that can be configured to implement the resuming applications and/or exempting applications from suspension in accordance with one or more embodiments. Computing device 500 can be, for example, computing device 100 of FIG. 1.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Processor 502, computer readable media 504, one or more of devices 508, and/or bus 510 can optionally be implemented as a single component or chip (e.g., a system on a chip). Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or non-volatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communication media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. Computer storage media refer to media for storage of information in contrast to mere signal transmission, carrier waves, or signals per se. Thus, computer storage media refers to non-signal bearing media, and is not communication media.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. In the case of hardware implementation, the module or component represents a functional block or other hardware that performs specified tasks. For example, in a hardware implementation the module or component can be an application-specific integrated circuit (ASIC), field-programmable gate array (FPGA), complex programmable logic device (CPLD), and so forth. The features of the resuming applications and/or exempting applications from suspension techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    determining multiple applications on a computing device that are to be suspended due to not satisfying a policy;
    determining, on the computing device, one application of multiple applications running on the computing device that is to be exempted from being suspended; and
    exempting, in response to the determination, the one application from being suspended on the computing device.

2. A method as recited in claim 1, further comprising:
    subsequently allowing the one application to be suspended due at least in part to the computing device no longer displaying a user interface for the one application;
    receiving, from an operating system component running on the computing device, a request to resume execution of the one application that has been suspended; and
    resuming, in response to the request, execution of the one application.

3. A method as recited in claim 1, the determining comprising determining that the one application is to be exempted from being suspended in response to the one application performing an operation that is to be allowed to continue.

4. A method as recited in claim 3, the one application comprising an audio player and the operation comprising playing back audio content.

5. A method as recited in claim 3, the operation comprising printing a document.

6. A method as recited in claim 3, the operation comprising communicating with a device at at least a threshold rate.

7. A method as recited in claim 1, the exempting comprising exempting the one application for an amount of time, and allowing the one application to be suspended after the amount of time elapses.

8. A method as recited in claim 7, the amount of time being dependent on an exemption class for the one application, with different exemption classes having different amounts of time.

9. A method as recited in claim 1, further comprising allowing the one application to be suspended in response to occurrence of an event.

10. A method as recited in claim 9, the event comprising a notification from an operating system component that the application is to no longer be exempted from being suspended.

11. A method comprising:
    receiving, from an operating system component running on a computing device, a request to resume execution of an application that has been suspended due to the application not satisfying a policy on the computing device; and
    resuming, in response to the request, execution of the application.

12. A method as recited in claim 11, the request being received in response to the operating system component determining that a communication with the application is desired, the communication comprising an inter-process communication with another application.

13. A method as recited in claim 11, the request being received in response to the operating system component determining that a communication with the application is desired, the communication comprising a communication to obtain data from the application in response to a user request received by another application.

14. A method as recited in claim 11, the request being received in response to the operating system component determining that a communication with the application is desired, the communication comprising communication with the operating system component.

15. A method as recited in claim 11, further comprising exempting, in response to the request, the application from being suspended on the computing device.

16. A method as recited in claim 15, the exempting comprising exempting the application until a notification is received from the operating system component that a reason for requesting that execution of the application be resumed is no longer present, and allowing the application to be suspended in response to the notification.

17. A method as recited in claim 16, the exempting comprising exempting the application for an amount of time, and allowing the application to be suspended after the amount of time elapses.

18. A method as recited in claim 17, the amount of time being dependent on a reason why the application is being requested to be resumed.

19. A method as recited in claim 11, the policy being stored on the computing device and being that the application is to be suspended when the computing device is no longer displaying a user interface for the application.

20. A computing device comprising:
one or more processors; and
one or more computer storage media having stored thereon multiple instructions that, when executed by the one or more processors, cause the one or more processors to perform acts comprising:
  determining multiple applications on the computing device that are to be suspended due to not satisfying a policy;
  determining, on the computing device, one application of multiple applications running on the computing device that is to be exempted from being suspended; and
  exempting, in response to the determination, the one application from being suspended on the computing device.

21. A computing device comprising:
one or more processors; and
one or more computer storage media having stored thereon multiple instructions that, responsive to execution by the one or more processors, cause the one or more processors to perform acts comprising:
  receiving, from an operating system component running on the computing device, a request to resume execution of an application that has been suspended due to the application not satisfying a policy on the computing device; and
  resuming, in response to the request, execution of the application.

22. A computing device as recited in claim 21, the request being received in response to the operating system component determining that a communication with the application is desired, the communication comprising an inter-process communication with another application.

23. A computing device as recited in claim 21, the request being received in response to the operating system component determining that a communication with the application is desired, the communication comprising a communication to obtain data from the application in response to a user request received by another application.

24. A computing device as recited in claim 21, the request being received in response to the operating system component determining that a communication with the application is desired, the communication comprising communication with the operating system component.

25. A computing device as recited in claim 21, the acts further comprising exempting, in response to the request, the application from being suspended on the computing device, the exempting comprising exempting the application until a notification is received from the operating system component that a reason for requesting that execution of the application be resumed is no longer present, and allowing the application to be suspended in response to the notification.

* * * * *